Feb. 20, 1945. E. G. RAMBERG 2,369,796
ELECTRON LENS SYSTEM
Filed March 26, 1943
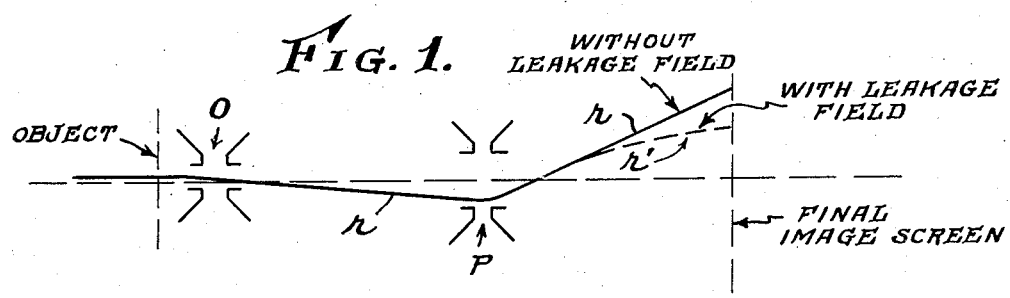
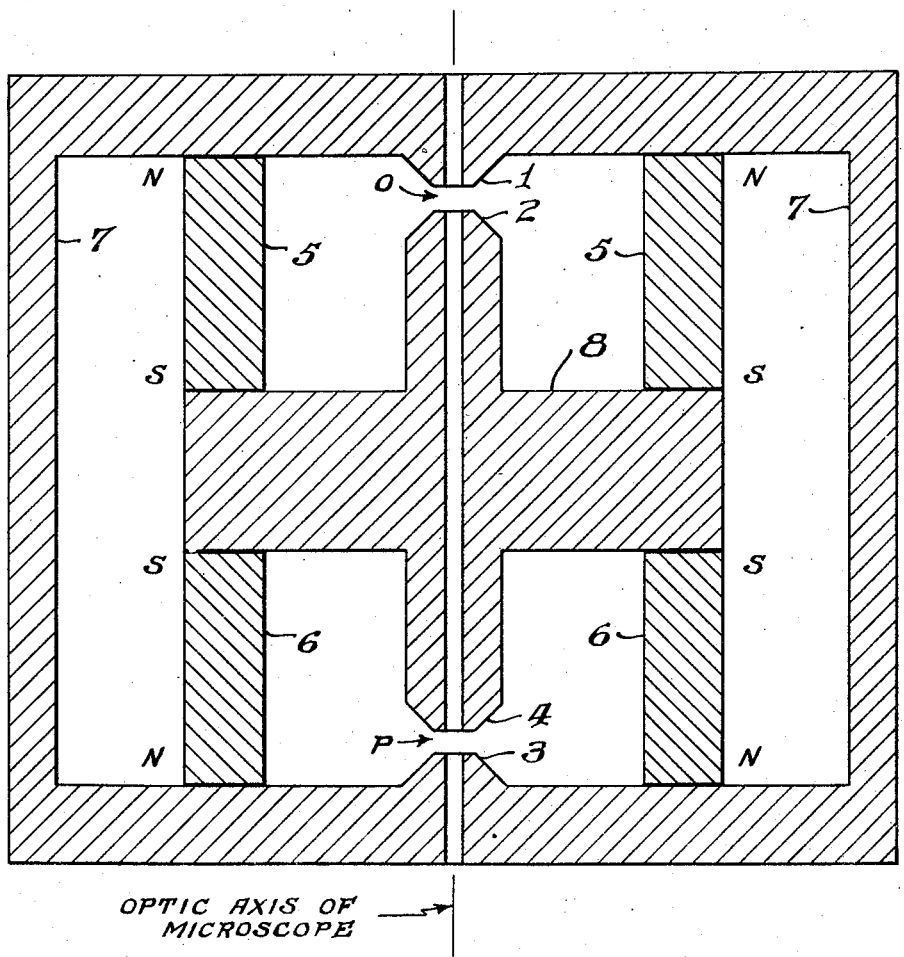
Inventor
Edward G. Ramberg Patented Feb. 20, 1945

2,369,796

UNITED STATES PATENT OFFICE 2,369,796

ELECTRON LENS SYSTEM

Edward G. Ramberg, Powellsville, Md., assignor to Radio Corporation of America, a corporation of Delaware Application March 26, 1943, Serial No. 480,649

4 Claims. (Cl. 250—161)

This invention relates to magnetically actuated electron lens systems for use in electron microscopes and like apparatus, and has special reference to the provision of an improved lens system of the type employing permanent magnets.

The invention will be described in connection with the accompanying drawing wherein:

Figure 1 is a diagrammatic view of an electron lens system showing the effects of leakage fields upon the electrons and Figure 2 is a longitudinal sectional view of a lens system utilizing permanent magnets and constructed in accordance with the principle of the present invention.

Attempts to use permanent magnets for the excitation of electron lenses have heretofore not met with any substantial degree of success, principally because of the leakage fields which exist beyond the lens region. The effect of such leakage fields may be reduced by using suitably disposed shields, but cannot be eliminated when the lenses are of uniform polarity (magnetic field direction) since, for symmetric fields produced only by permanent magnets, the integral of the field ($\int H dz$) along the axis must vanish; thus, fields of opposite polarity must exist beyond the lens region. These fields are objectionable because they tend to reduce the magnification of the system. Thus, as shown in Figure 1, a ray $r$ leaving the objective lens O at a point off the axis, does not proceed, after leaving the projector lens P, in a straight line but is bent toward the axis, as indicated at $r'$, and strikes the image screen at a smaller distance from the axis than it would if the leakage field were not present.

Accordingly, the principal object of the present invention is to provide an electron lens system, utilizing permanent magnets, which is free from external leakage fields (which tend to reduce the magnification of the instrument), and one possessing further advantages, e. g., from the point of view of low rotational aberration.

The present invention provides a permanent magnet electron-lens system wherein leakage fields are reduced by giving the objective and projector lenses opposite polarities, and are substantially entirely eliminated by the provision of a magnetic structure or "armature" which renders the adjacent outside space a magnetically unipotential region so that no fields due to the permanent magnets can there exist. An added advantage of the "bucking" lens fields of the present invention is that they cause a reduction of the rotational or anisotropic aberrations of the final image.

In the embodiment of the invention which has been selected for purposes of illustration the lens system comprises an objective lens O and a projector lens P formed by apertured pole pieces 1, 2 and 3, 4 of conventional shape arranged along a common axis and excited by permanent magnets 5 and 6. The parts 5 and 6 in the instant case comprise two ring magnets arranged about the upper and lower lenses O and P respectively, but may comprise two sets of rod or bar magnets, similarly disposed. The outer lens elements or pole pieces 1 and 3 are connected to or form part of a cylinder 7 which is constituted of soft iron and the inner pole pieces 2 and 4 are connected to another magnetically permeable member 8 which is supported between the adjacent ends of the permanent magnets 5 and 6. It will be observed that, as indicated by the symbols N (north) and S (south), the magnets 5 and 6 are arranged with their poles in "bucking" relation, hence the fields in the two lenses O and P are also of opposite polarity. This magnetic condition in the two lenses results in low rotational or anisotropic aberrations since the aberration components due to the two lenses are of opposite sign. Since the surrounding soft iron armature 7 is connected to the upper pole piece 1 of the lens O and to the lower pole piece 3 of the lens P, as well as to the similar poles N of the magnets, the space outside of the system is made magnetically equipotential, so that no leakage fields can there exist.

From the foregoing it will be apparent that the present invention provides an improved permanent magnet electron-lens system which possesses advantages from the point of view of low rotational aberration and one free from external leakage fields which tend to reduce the magnification of the electron microscope or other instrument in which it is incorporated.

What is claimed is:

1. An electron lens system including, in combination, a plurality of permanent magnets arranged with their poles in bucking relation, a plurality of pairs of apertured lens elements mounted, respectively, in the magnetic path between the opposite poles of each magnet, and a magnetically permeable structure connecting the like poles of said magnets one to another.

2. The invention as set forth in claim 1 and wherein said magnetically permeable structure comprises a support for said plurality of permanent magnets.

3. An electron lens system comprising, in combination, a pair of permanent magnets arranged with their poles in bucking relation, a magnetically permeable member including a plurality of oppositely extending apertured lens elements supported between the adjacent ends of said permanent magnets, and a second magnetically permeable member connected to the remote ends of said permanent magnets and including a plurality of apertured lens elements arranged in register with said first-mentioned apertured lens elements.

4. The invention as set forth in claim 3 and wherein said second-mentioned magnetically permeable member comprises a hollow casing within which said permanent magnets and said first-mentioned magnetically permeable member are mounted.

EDWARD G. RAMBERG.